US010168898B2

(12) United States Patent
Rossi et al.

(10) Patent No.: US 10,168,898 B2
(45) Date of Patent: *Jan. 1, 2019

(54) SUPPORTING DIFFERENT EVENT MODELS USING A SINGLE INPUT SOURCE

(71) Applicant: Microsoft Technology Licensing, LLC, Redmond, WA (US)

(72) Inventors: Jacob S. Rossi, Seattle, WA (US); Justin E. Rogers, Redmond, WA (US); Nathan J. E. Furtwangler, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

This patent is subject to a terminal disclaimer.

(21) Appl. No.: 15/016,036

(22) Filed: Feb. 4, 2016

(65) Prior Publication Data

US 2016/0147439 A1 May 26, 2016

Related U.S. Application Data

(62) Division of application No. 13/363,188, filed on Jan. 31, 2012, now Pat. No. 9,274,700.

(30) Foreign Application Priority Data

Jan. 6, 2012 (CA) ..................................... 2763328

(51) Int. Cl.
*G06F 3/00* (2006.01)
*G06F 13/12* (2006.01)
(Continued)

(52) U.S. Cl.
CPC .......... *G06F 3/04883* (2013.01); *G06F 3/038* (2013.01); *G06F 3/03543* (2013.01); *G06F 3/0488* (2013.01)

(58) Field of Classification Search
CPC .. G06F 9/5066; G06F 17/30914; G06F 3/016; G06F 3/017; G06F 3/021;
(Continued)

(56) References Cited

U.S. PATENT DOCUMENTS 6,073,183 A 6/2000 Slonim
6,625,665 B1 9/2003 McCabe
(Continued)

FOREIGN PATENT DOCUMENTS

CN 1287429 3/2001
EP 1971096 9/2008
(Continued)

OTHER PUBLICATIONS

"Converting single-touch events to mouse events." Random Thoughts of a Programmer. Dec. 22, 2010.*
(Continued)

*Primary Examiner* — Farley Abad
*Assistant Examiner* — Henry W Yu

(57) ABSTRACT

In at least some embodiments, input provided by a single source generates events representing multiple source types through a mapping process, e.g. a touch input generates both touch and mouse events. By configuring the system to not recognize certain gestures, messages associated with the events of the different source types are then interleaved and provided to an associated application for processing. Efficiencies are gained by configuring the system to interleave the messages associated with the source types because messages of one source type can be processed sooner than if the messages of the one source type were queued up and sent in a non-interleaved fashion.

19 Claims, 5 Drawing Sheets

(51) Int. Cl.
  *G09G 5/00* (2006.01)
  *G06F 3/041* (2006.01)
  *G06F 9/44* (2018.01)
  *G06F 3/0488* (2013.01)
  *G06F 3/038* (2013.01)
  *G06F 3/0354* (2013.01)

(58) Field of Classification Search
  CPC ........ G06F 3/0213; G05B 2219/13022; G05B 2219/35381; G05B 2219/35546; G05B 2219/36232
  USPC .................. 710/5, 8, 11, 14, 16, 62, 72–73; 345/156, 173; 719/310, 318; 711/103
  See application file for complete search history.

(56) References Cited

U.S. PATENT DOCUMENTS

| | | | |
|---|---|---|---|
| 6,657,615 | B2 | 12/2003 | Harada |
| 7,035,909 | B1 | 4/2006 | Lee et al. |
| 7,817,154 | B1* | 10/2010 | Sams ................... G06T 1/20 345/501 |
| 7,932,895 | B2 | 4/2011 | Rainisto |
| 8,108,843 | B2 | 1/2012 | Nair et al. |
| 9,274,700 | B2 | 3/2016 | Rossi et al. |
| 2002/0116601 | A1 | 8/2002 | Skrzeszewski et al. |
| 2003/0025839 | A1 | 2/2003 | Xiang et al. |
| 2005/0198578 | A1 | 9/2005 | Agrawala et al. |
| 2006/0077174 | A1 | 4/2006 | Chung et al. |
| 2007/0005893 | A1* | 1/2007 | Mates .................. G06F 9/383 711/118 |
| 2008/0250045 | A1* | 10/2008 | Balassanian ...... G06F 17/30569 |
| 2009/0300530 | A1 | 12/2009 | Falchuk |
| 2010/0020025 | A1 | 1/2010 | Lemort et al. |
| 2011/0050610 | A1* | 3/2011 | Pearce ................. G06F 3/038 345/173 |
| 2011/0175827 | A1 | 7/2011 | Bogue |
| 2012/0110242 | A1 | 5/2012 | Tsai et al. |
| 2012/0174121 | A1 | 7/2012 | Treat et al. |
| 2013/0179598 | A1 | 7/2013 | Rossi |

FOREIGN PATENT DOCUMENTS

| | | |
|---|---|---|
| GB | 2466077 | 6/2010 |
| JP | 2004362052 | 12/2004 |
| JP | 2010033104 | 2/2010 |
| WO | WO-2007030310 | 3/2007 |
| WO | WO-2010026587 | 3/2010 |
| WO | WO-2013103927 | 7/2013 |

OTHER PUBLICATIONS

"Foreign Office Action", EP Application No. 13733674.9, dated Feb. 6, 2017, 7 pages.
"Foreign Office Action", CN Application No. 201380004797.6, dated Nov. 17, 2016, 7 pages.
"Foreign Notice of Allowance", CN Application No. 201380004797.6, dated Mar. 13, 2017, 4 pages.
"Converting Single-Touch Events to Mouse Events", Retrieved from: <http://vetruvet.blogspot.com/2010/12/converting-single-touch-events-to-mouse.html> on Jan. 4, 2012, Dec. 22, 2010, 5 pages.
"Extended European Search Report", EP Application No. 13733674.9, dated Nov. 9, 2015, 13 pages.
"Final Office Action", U.S. Appl. No. 13/363,188, dated Apr. 23, 2015, 16 pages.
"Final Office Action", U.S. Appl. No. 13/363,188, dated May 8, 2014, 16 pages.
"Foreign Office Action", CA Application No. 2,763,328, dated Mar. 24, 2015, 3 pages.
"Foreign Office Action", CA Application No. 2,763,328, dated Apr. 19, 2013, 8 pages.
"Foreign Office Action", CA Application No. 2,763,328, dated Jun. 20, 2014, 4 Pages.
"Foreign Office Action", CA Application No. 2,763,328, dated Oct. 22, 2013, 3 pages.
"Foreign Office Action", CA Application No. 2,763,328, dated Oct. 24, 2014, 6 Pages.
"Foreign Office Action", CA Application No. 2,763,328, dated Nov. 23, 2012, 5 pages.
"Foreign Office Action", CA Application No. 2,763,328, dated Mar. 28, 2014, 4 pages.
"Foreign Office Action", CA Application No. 2,763,328, dated May 7, 2012, 5 pages.
"Foreign Office Action", CA Application No. 2,763,328, dated Jul. 25, 2012, 5 pages.
"International Search Report and Written Opinion", Application No. PCT/US2013/020431, dated Apr. 23, 2013, 8 pages.
"Non-Final Office Action", U.S. Appl. No. 13/363,188, dated Oct. 9, 2014, 17 pages.
"Non-Final Office Action", U.S. Appl. No. 13/363,188, dated Dec. 20, 2013, 14 pages.
"Notice of Allowance", U.S. Appl. No. 13/363,188, dated Oct. 22, 2015, 10 pages.
"Random Thoughts of a Programmer: Converting Single-Touch Events to Mouse Events", Retrieved from: <http://vetruvet.blogspot.com/2010/12/converting-single-touch-events-to-mouse.html> on Nov. 30, 2012, Dec. 22, 2010, 5 pages.
"Supplementary European Search Report", EP Application No. 13733674.9, dated Jul. 14, 2015, 6 pages.
Bastea-Forte,"Pointer: Multiple Collocated Display Inputs Suggests New Models for Program Design and Debugging", In Proceedings of UIST 2007, Oct. 2007, 2 pages.
Bhattacharya,"jQuery Drag Event Plugin with Touch Support", Retrieved from: <http://www.shamasis.net/projects/jquery-touch-drag/> on Jan. 4, 2012, 11 pages.
Hinckley,"Touch-Sensing Input Devices", In Proceedings of ACM SIGCHI 1999, May 15, 1999, 8 pages.
Matejka,"The Design and Evaluation of Multi-Finger Mouse Emulation Techniques", In Proceedings of CHI 2009, Available at <http://www.dgp.toronto.edu/~tovi/papers/2009%20CHI%20SDMouse.pdf>, Apr. 7, 2009, pp. 1073-1082.
Trubachev,"Converting single-touch events to mouse events", Retrieved from <http://vetruvet.blogspot.com/search?updated-min=2010-01-01T00:00:00-05:00&updated-max=2011-01-01T00:00:00-05:00&max-results=4> on Dec. 23, 2013, Dec. 22, 2010, 5 pages.
Villar,"Mouse 2.0: Multi-touch Meets the Mouse", In Proceedings of UIST 2009, Available at <http://research.microsoft.com/en-us/um/people/benko/publications/2009/uist304-mouse2.pdf>, Oct. 2009, 10 pages.
"Foreign Notice of Allowance", CA Application No. 2,763,328, dated May 22, 2016, 1 pages.
"Foreign Office Action", CN Application No. 201380004797.6, dated Mar. 30, 2016, 14 pages.
"Office Action Issued in Canadian Patent Application No. 2826288", dated Nov. 22, 2017, 6 Pages.

* cited by examiner

SUPPORTING DIFFERENT EVENT MODELS USING A SINGLE INPUT SOURCE

RELATED APPLICATIONS

This application is a divisional of and claims priority under 35 U.S.C. § 120 to U.S. Utility application Ser. No. 13/363,188, filed Jan. 31, 2012 and titled "Supporting Different Event Models using a Single Input Source" which in turn claims priority under 35 U.S.C. § 119(b) to Canadian Patent Application Serial No. 2,763,328 filed on Jan. 6, 2012 and titled "Supporting Different Event Models using a Single Input Source," the disclosures of which are incorporated by reference in their entirety herein.

BACKGROUND

Many web sites are primarily designed for mouse input. That is, the web sites react to script events such as mousedown, mouseup, mousemove. However, newer hardware devices and evolving platforms have provided the capability for entering input by other ways, e.g., touch input and input through a natural user interface (NUI). These newer devices and systems can present compatibility and performance challenges for applications that were designed primarily for mouse input.

SUMMARY

This Summary is provided to introduce a selection of concepts in a simplified form that are further described below in the Detailed Description. This Summary is not intended to identify key features or essential features of the claimed subject matter.

In at least some embodiments, input provided by a single source generates events representing multiple source types through a mapping process, e.g. a touch input generates both touch and mouse events. By configuring the system to not recognize certain gestures, messages associated with the events of the different source types are then interleaved and provided to an associated application for processing. Efficiencies are gained by configuring the system to interleave the messages associated with the source types because messages of one source type can be processed sooner than if the messages of the one source type were queued up and sent in a non-interleaved fashion.

In at least some other embodiments, messages associated with the different source types are correlated in a cache. Data that is produced from one message is saved and re-used in association with a correlated message so that the processing that produced the data does not have to be repeated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

In at least some embodiments, input provided by a single source generates events representing multiple source types through a mapping process, e.g. a touch input generates both touch and mouse events. By configuring the system to not recognize certain gestures, messages associated with the events of the different source types are then interleaved and provided to an associated application for processing. Efficiencies are gained by configuring the system to interleave the messages associated with the source types because messages of one source type can be processed sooner than if the messages of the one source type were queued up and sent in a non-interleaved fashion.

In at least some other embodiments, messages associated with the different source types are correlated in a cache. Data that is produced from one message is saved and re-used in association with a correlated message so that the processing that produced the data does not have to be repeated.

In the following discussion, an example environment is first described that is operable to employ the techniques described herein. Example illustrations of the various embodiments are then described, which may be employed in the example environment, as well as in other environments. Accordingly, the example environment is not limited to performing the described embodiments and the described embodiments are not limited to implementation in the example environment.

Example Operating Environment

Figure 1:
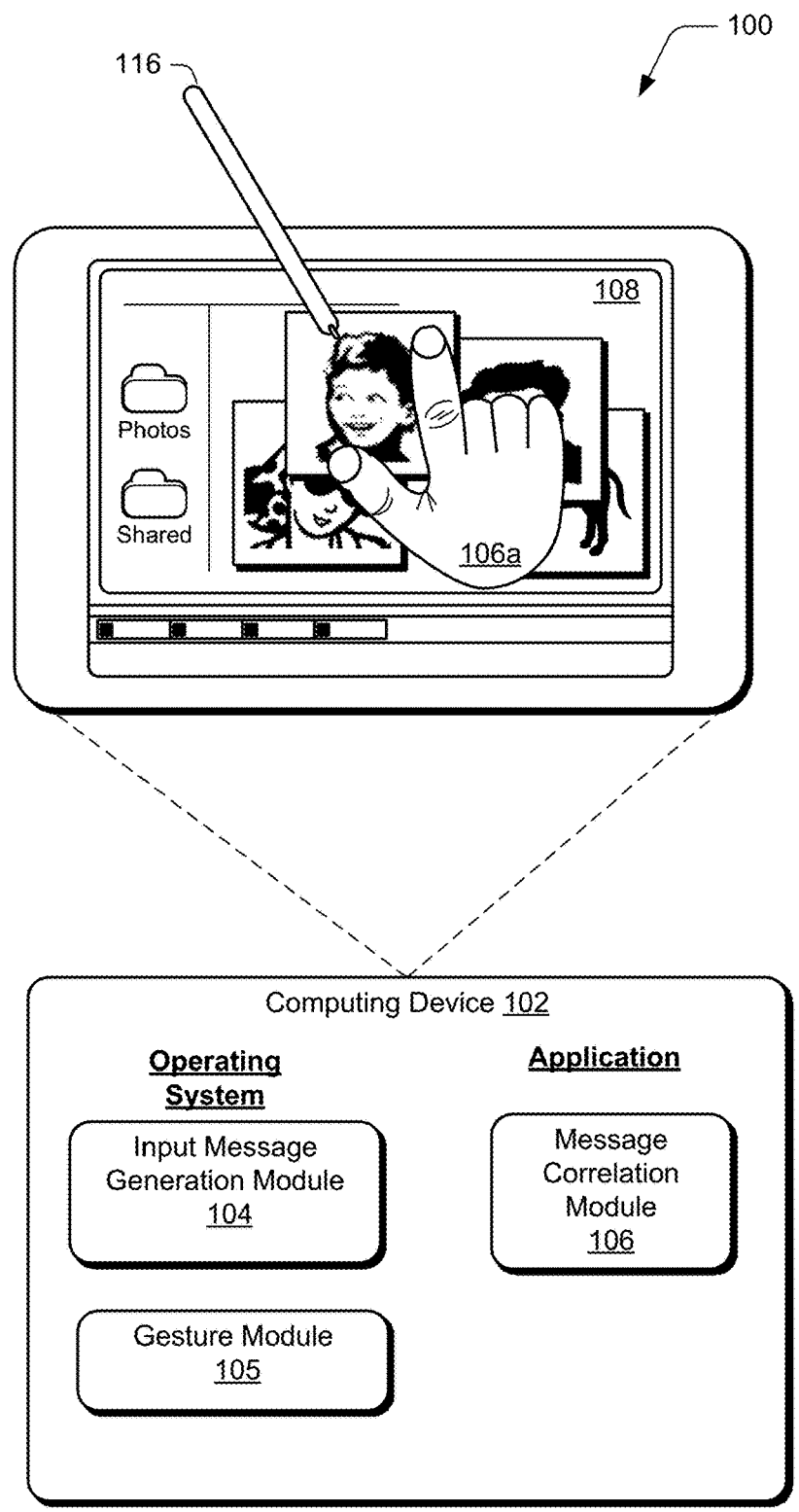
FIG. 1 is an illustration of an environment in an example implementation in accordance with one or more embodiments.

FIG. 1 is an illustration of an environment 100 in an example implementation that is operable to employ the techniques described in this document. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes an operating system having an input message generation module 104 and a gesture module 105. In addition, the computing device includes one or more applications having or otherwise making use of a message correlation module 106. In operation, the operating system receives hardware input and, using input from gesture module 105, produces messages for the application using the input message generation module 104. Among its roles, the application configures the operating system such that the messages it produces using the input message generation module 104 are interleaved. This can be achieved by communicating to the operating system that certain gestures, e.g., those that map to right-click messages and time-spanning gestures like "press and hold", are not desired to be detected. In addition, the message correlation module 106 consumes the interleaved messages and correlates them together in a cache, as described below. The correlated messages can be used in order to share data between two event streams, thus promoting better performance, as will become apparent below.

Gesture module 105 recognizes input pointer gestures that can be performed by one or more fingers, and causes operations or actions to be performed that correspond to the gestures. The gestures may be recognized by module 105 in a variety of different ways. For example, the gesture module 105 may be configured to recognize a touch input, such as a finger of a user's hand 106*a* as proximal to display device 108 of the computing device 102 using touchscreen functionality, or functionality that senses proximity of a user's finger that may not necessarily be physically touching the display device 108, e.g., using near field technology. Module 105 can be utilized to recognize single-finger gestures and bezel gestures, multiple-finger/same-hand gestures and bezel gestures, and/or multiple-finger/different-hand gestures and bezel gestures. The functionality implemented by modules 104 and/or 105 can be implemented by any suitably configured application such as, by way of example and not limitation, a web browser. Other applications can be utilized without departing from the spirit and scope of the claimed subject matter.

The computing device 102 may also be configured to detect and differentiate between a touch input (e.g., provided by one or more fingers of the user's hand 106*a*) and a stylus input (e.g., provided by a stylus 116). The differentiation may be performed in a variety of ways, such as by detecting an amount of the display device 108 that is contacted by the finger of the user's hand 106*a* versus an amount of the display device 108 that is contacted by the stylus 116.

Thus, the gesture module 105 may support a variety of different gesture techniques through recognition and leverage of a division between stylus and touch inputs, as well as different types of touch inputs and non-touch inputs.

Figure 2:
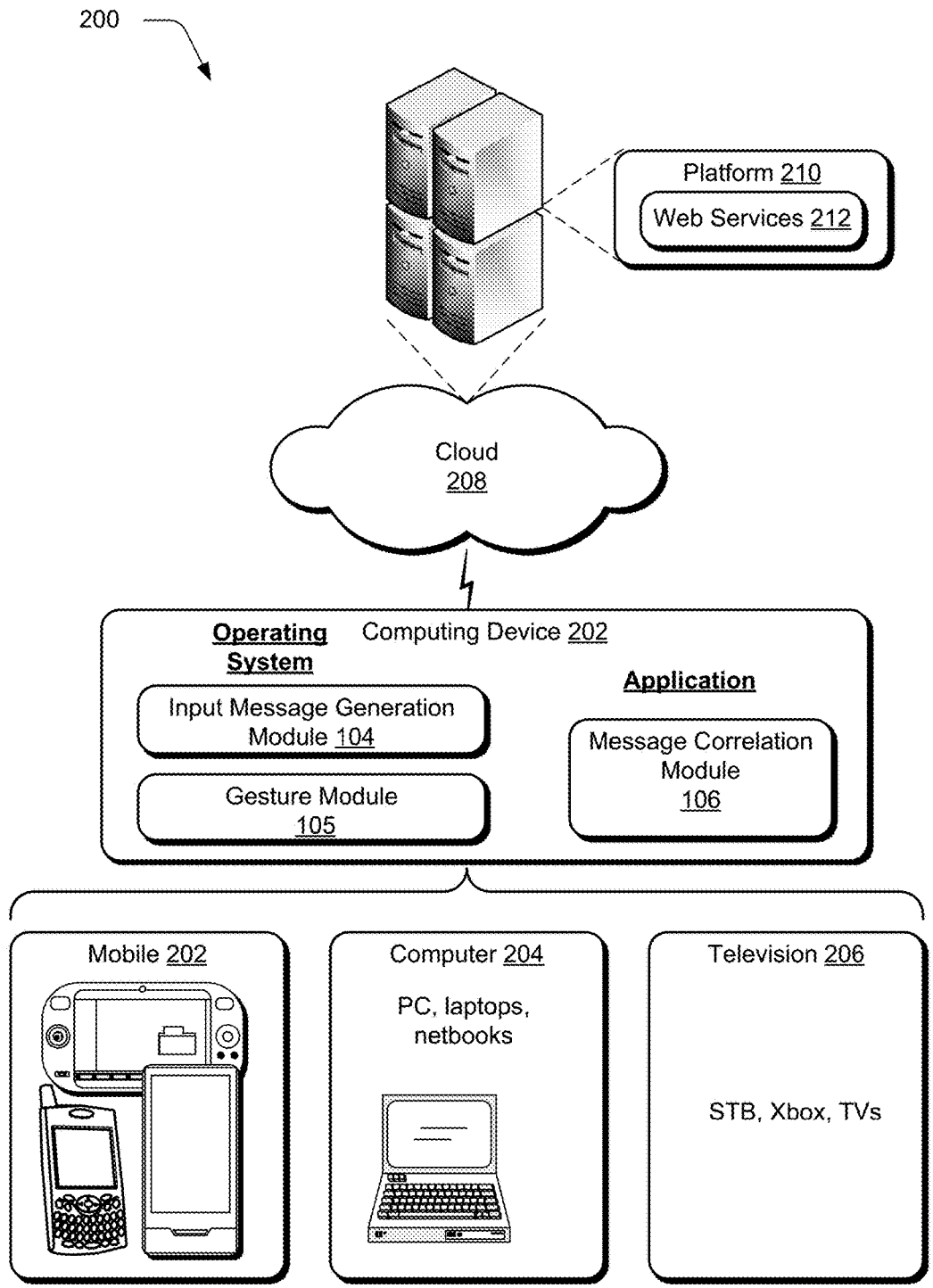
FIG. 2 is an illustration of a system in an example implementation showing FIG. 1 in greater detail.

FIG. 2 illustrates an example system 200 showing the input message generation module 104, gesture module 105, and message correlation module 106 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on.

Thus, the cloud 208 is included as a part of the strategy that pertains to software and hardware resources that are made available to the computing device 102 via the Internet or other networks.

The gesture techniques supported by the modules 104, 105 and 106 may be detected using touchscreen functionality in the mobile configuration 202, track pad functionality of the computer 204 configuration, detected by a camera as part of support of a natural user interface (NUI) that does not involve contact with a specific input device, and so on. Further, performance of the operations to detect and recognize the inputs to identify a particular gesture may be distributed throughout the system 200, such as by the computing device 102 and/or the web services 212 supported by the platform 210 of the cloud 208.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

In the discussion that follows, various sections describe various example embodiments. A section entitled "Message Interleaving" describes how event messages can be interleaved in accordance with one or more embodiments. Next, a section entitled "Message Correlation" describes how messages can be correlated in accordance with one or more embodiments. Last, a section entitled "Example Device" describes aspects of an example device that can be utilized to implement one or more embodiments.

Having described example operating environments in which interleaving and correlation functionality can be utilized, consider now a discussion of an example embodiments.

Message Interleaving

In message interleaving, input provided by a single source, such as a touch, generates events of multiple source types, e.g., touch events and mouse events, through a mapping process. By configuring the system to not recognize certain gestures, messages associated with the events of the different source types are then interleaved and provided to an associated application for processing. Efficiencies are gained by configuring the system to interleave the messages associated with the different source types because messages of one source type, e.g. mouse-related messages, can be processed sooner than if the messages of one source type were queued up and sent in a non-interleaved fashion.

As a contextual example, consider the following. When adding support for touch (or some other new input source, e.g. near field or NUI), a development platform can provide some type of translation of that new input type to an existing known input type (e.g., mouse) for the sake of compatibility with existing webpages or applications. This allows applications that were written for mouse input to work with touch input, as well as any other type of input that might not necessarily be recognized by the application. These types of applications would not recognize or be able to process touch-related messages. So, by providing a translation mechanism between the different message types, older applications can function properly in the presence of unrecognized input messages. Furthermore, for those applications that recognize both types of input, message processing can be more efficient because interleaved messages of one type source will be received sooner (and processed) than if the messages were all queued up and sent in separate batches.

One approach to address different message types is as follows. When gestural touch input is received, the gestural touch input can be mapped to a sequence of batched mouse messages. For example, when a sequence of touch messages indicates a gestural tap, then after having dispatched the touch messages, the platform might dispatch a predefined sequence of mouse messages. For example, a "tap" might map to a mousedown event, a mouseup event and a click event. In this case, the tap was generated by processing a series of individual touch messages. While providing support for older applications, this approach can have performance issues because, as noted above, the mouse-related messages are queued and sent after the touch-related messages. Thus, the mouse messages are processed later than they would be had the message stream been interleaved.

To address this situation, in one or more embodiments, when an input is received, such as a touch input, an event associated with the touch input is mapped to an event associated with another input type. Messages associated with the different events are interleaved and sent to an application, such as a web browser, for processing. The mapping process according to this approach is not necessarily gestural based insofar as waiting for resolution of a touch gesture in order to then map the gesture to a sequence of mouse events. So, for example, a touchdown can be mapped to a mousedown, rather than waiting to resolve the touchdown as a tap, and then mapping the tap gesture to a sequence of mousedown/mouseup/click. In this approach, a touchdown maps to a mousedown, a touchup maps to a mouseup, and a tap maps to a click. In at least some embodiments, there is no distinction between different mouse buttons, e.g., left and right buttons, in the mapping process. Using this approach, a touch down can be immediately mapped to a mouse down. Of course, other approaches can be utilized including those that support mouse button differentiation. For example, pen devices often have a button that can be held while interacting to signal the interaction is to be mapped to the right mouse button in mouse-based applications.

Accordingly, using this approach, mapping occurs on a per message basis, rather than mapping a sequence of messages to a different sequence of messages. This causes the two generated message streams, e.g., touch and mouse message streams, to be interleaved for efficient processing by the application or web browser.

Using this approach, a simple tap interaction may, in some systems, dispatch the following events in this order:

MSPointerOver,
mouseover,
MSPointerDown,
mousedown,
MSPointerMove,
mousemove,
MSPointerUp,
mouseup,
MSPointerOut,
mouseout As can be seen, individual mouse events that have been translated or mapped from the touch input are received and processed by the application sooner than if the gesture was resolved and then mapped to a sequence of mouse events. The interleaving thus improves performance, as will be appreciated by the skilled artisan, because messages are mapped sooner, rather than waiting for the completion of a gesture. Compatibility with legacy content is also improved because more specific interactions (such as down/move/up versus just a single tap) are mapped quicker and more closely to their mouse counterpart.

Figure 3:
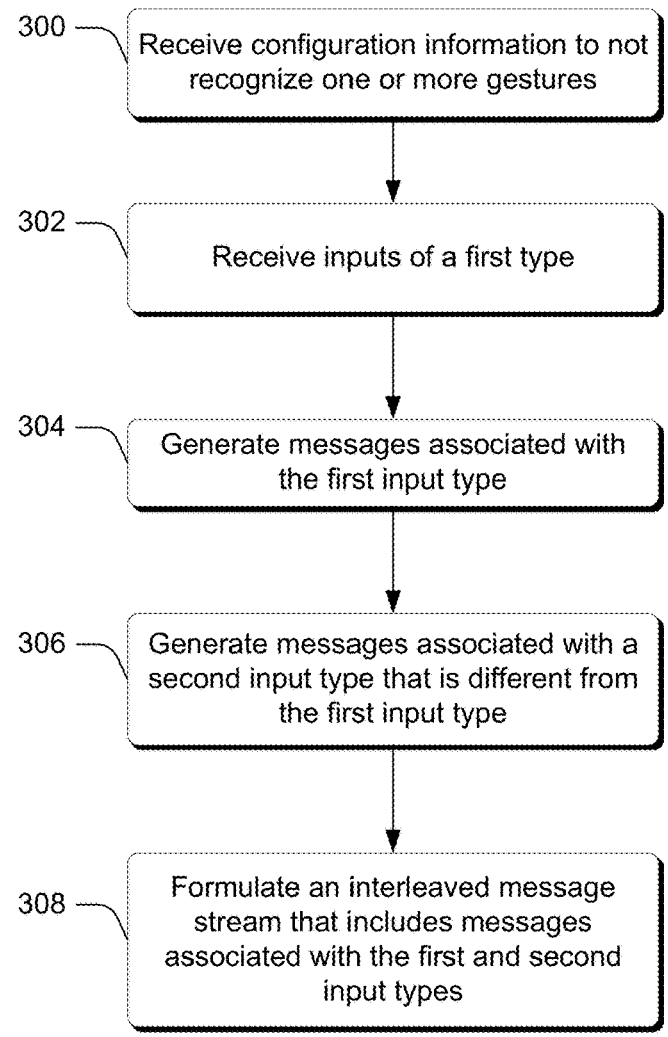
FIG. 3 is a flow diagram that describes steps in a method in accordance with one or more embodiments.

FIG. 3 is a flow diagram that describes steps in a method accordance with one or more embodiments. The method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. Examples of software that can perform the functionality about to be described are applications that are to receive messages, an associated operating system, input message generation module 104 and the gesture module 105 described above.

Step 300 receives configuration information to not recognize one or more gestures. This step can be performed by an application notifying the operating system to not recognize gestures that would otherwise cause a delay in generating messages associated with the first input type mentioned below. For example, in at least some embodiments, one gesture that can be the subject of this step is a "press and hold" gesture. Specifically, in some systems, "taps" map to left button clicks on a mouse, but "holds" map to right button clicks. At the time the user's finger comes down, the operating system cannot determine whether to send left mouse messages or right mouse messages because it has to wait until it can safely differentiate tap/holds based, for example, on a timer. In this instance, the operating system can be configured to not recognize "holds". In that state, the operating system does not have to wait to dispatch mouse messages from the touch input. It simply treats touch down input as a left mouse down. Thus, the input message generation module can start interleaving pointerdown ("touchdown")/mousedown, pointerup/mouseup, and the like, as described below.

Step 302 receives inputs of a first type. Any suitable type of inputs can be received including, by way of example and not limitation, a touch input or inputs that collectively define a gesture. Step 304 generates messages associated with the first input type. Responsive to receiving the inputs of a first type, step 306 generates messages associated with a second input type that is different from the first input type. Any suitable type of second input type can be utilized. In at least some embodiments, a second input type comprises a mouse input.

Step 308 formulates an interleaved message stream that includes messages associated with the first and second input types interleaved together. In the described approach, this step is performed as a result of configuring the operating system to not recognize certain gestures. The formulated interleaved message stream can then be provided to an application, such as a web browser, for processing as appropriate. It is to be appreciated and understood that interleaving and subsequent provision of the messages can be performed as the individual messages are generated, rather than waiting for an entire associated interleaved message stream to be formed and then provided to the application or web browser.

One way in which these messages can be processed by an application or web browser is described in the section just below.

Message Correlation

In at least some other embodiments, messages associated with the different sources are correlated in a cache. Data that is produced from one message is saved and re-used in association with a correlated message so that the processing that produced the data does not have to be repeated. In some instances, the processing that produces the data can be expensive. Accordingly, not repeating the processing for the different sources, but rather using the cached data for processing correlated messages can result in efficiencies, as will become apparent below.

So, for example, in the embodiment described just above, a single message stream was formulated to include messages associated with different sources or input types, e.g., touch-type and mouse-type inputs. Data that is produced as a result of a touch-type message can be saved and re-used for a correlated mouse-type message. As an example, consider the following.

In some Windows®-based systems, touch input is provided to an application via Pointer messages, such as WM_POINTERUPDATE messages. A "pointer" is an abstraction that represents any point of contact such as a mouse, finger, or pen, and the like. The pointer abstraction makes it easier for developers to write a single set of pointer events that encapsulate input from mouse, touch and pen. For compatibility, however, these messages can also be converted into Mouse messages, such as WM_MOUSEMOVE messages. It is possible that applications, such as a web browser, may handle both Pointer and Mouse messages. However, both sets of messages represent a single user input source mechanism (e.g., touch), yet it is not possible to directly correlate a mouse message with the pointer message for that same interaction.

Using a system of heuristics, different types of messages, e.g., pointer and mouse messages, can be correlated together so that data produced when processing pointer messages can be repurposed for the processing of mouse messages. For example, in at least some systems, only one touch contact is mapped into mouse because touch supports multiple pointers, while mouse does not. So, in systems like this, the first criteria utilized for correlation is that the Pointer message to be correlated is the "primary pointer," or the one that will get mapped to mouse. When a primary pointer message is received, the coordinates of the pointer message along with the data to be reused for efficiency gains are stored in the cache.

When the mapped mouse message is received, the system provides a mechanism to ascertain whether this is a true mouse message (e.g., directly produced from a mouse) or if it is a mapped mouse message. If it is a mapped mouse message, then the cache is checked for a pointer message that has the same coordinates as the mouse message. If a match is found, then the corresponding cached data is reused to go along with the message.

It is to be appreciated and understood, however, that mechanisms other than coordinates can be used for correlation. For example, if the two input messages share a precise hardware timestamp, this can be used for association. In practice, any unique value that is copied to the mouse message during the mapping process can be utilized.

As will be appreciated by the skilled artisan, this leads to improved performance because message-associated work is reduced. As an example of the type of data that can be cached and re-used, consider the following.

In some scenarios, when a pointer message is received, an associated application causes a hit test to be performed. Hit testing, as will be appreciated by the skilled artisan, is a mechanism by which an input subsystem processes input received and maps the received input to a display device coordinate system and pointer coordinates. The input hit is identified as coming from a particular user interface element in an associated display tree. In many instances, processing a display tree to identify an interface element can be an expensive operation.

The result of the hit test is then stored in a cache if the pointer message represents a primary pointer (i.e., a first contact) on the display screen. This is an indication that a mouse compatibility message (i.e. a mapped message) will later be received from the system, as described above. When a corresponding mouse message is received, it is correlated back to the pointer message by confirming with the system that the input source was touch and by matching the coordinates of the mouse message with the coordinates of the corresponding pointer message. If the mouse message is correlated with a pointer message, then the hit test result from the pointer message is reused for the processing of the mouse message. Understandably, this reduces the number of hit tests for a given user interaction by 50% or more. In addition, additional data produced while processing the pointer message can be cached for use during the processing of the correlated mouse message as desired. For example, state variables such as whether the browser should perform a default action in response to the interaction can be cached as well. As other examples of additional data that can be cached, consider the following. In some instances, touch-specific information, such as contact pressure, can be stored. Then, when a mouse message is correlated, a decision to perform "left button" or "right button" actions can be made based on how hard the contact was pressed.

Another class of examples include flags that indicate that an action was performed and to not perform it again. For example, if a pointer message is received that indicates that a finger is designating a new element, then a CSS Hover can be applied to it. When mouse message is then received, this action need not be repeated. Accordingly, a flag can be stored to indicate that hover has already been applied to that element.

Figure 4:
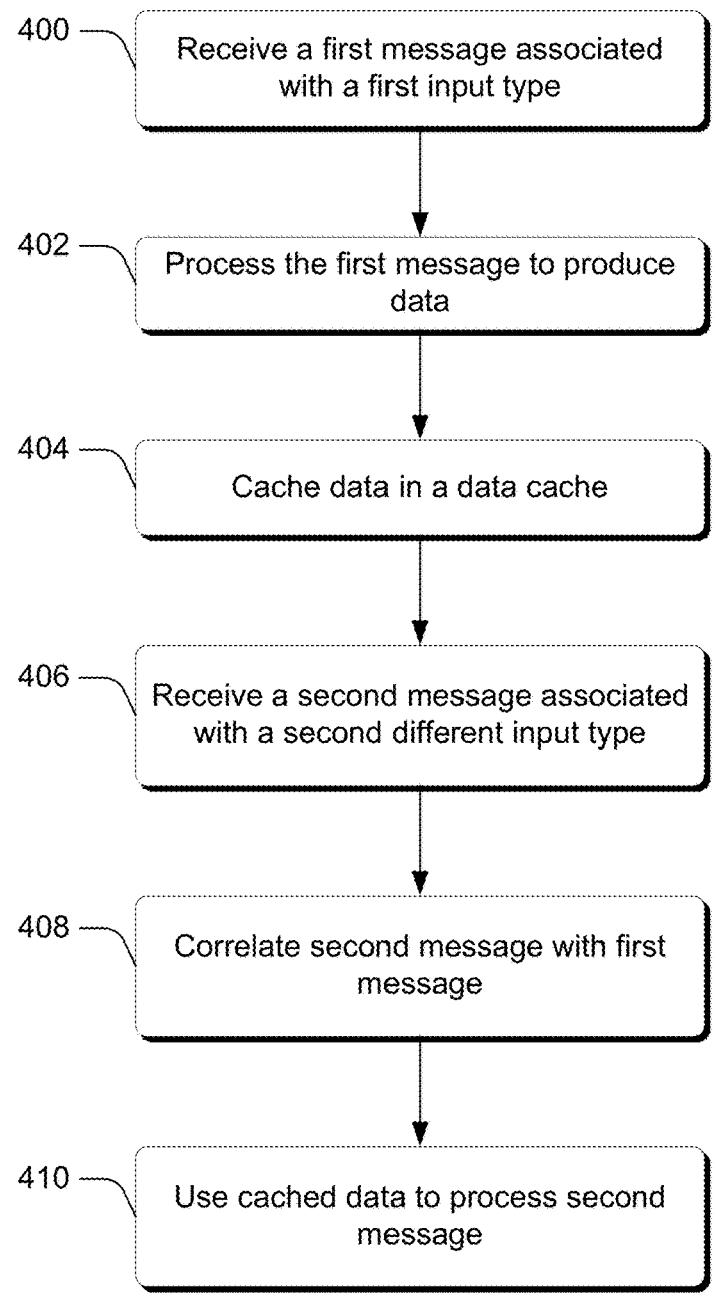
FIG. 4 is a flow diagram that describes steps in a method in accordance with one or more embodiments.

FIG. 4 is a flow diagram that describes steps in a method accordance with one or more embodiments. The method can be performed in connection with any suitable hardware, software, firmware, or combination thereof. In at least some embodiments, the method can be performed by software in the form of computer readable instructions, embodied on some type of computer-readable storage medium, which can be performed under the influence of one or more processors. Examples of software that can perform the functionality about to be described are the interleaving and correlation module 104 and the gesture module 105 described above.

Step 400 receives a first message associated with a first input type. Any suitable input type can be utilized. In at least some embodiments, the first input type comprises an input type associated with a touch input. Step 402 processes the first message to produce data. Any suitable type of data can be produced. In at least some embodiments, the data that is produced comprises data associated with a hit test. In at least some other embodiments, the data that is produced comprises data associated with an application state. Examples of state are provided above, as well as additional types of data. Step 404 caches the produced data in a data cache. Step 406 receives a second message associated with a second different input type. Any suitable type of different input can be utilized. In at least some embodiments, the second different input type comprises mouse input. In addition, the second message can comprise one that is produced to enable an application that may not understand the first message or first input type to process the first input type using the second message. In at least some embodiments, the second message can constitute a message that is produced by way of a mapping process such as that which is described above.

Step 408 correlates the second message with the first message. Any suitable approach can be utilized correlate the messages, examples of which are provided above. Step 410 uses the cached data to process the second message. By using the cached data to process the second message, work that was performed to process the first message to produce the data can be avoided.

Having considered various example embodiments, consider now an example device that can be used to implement the embodiments described above.

Example Device

Figure 5:
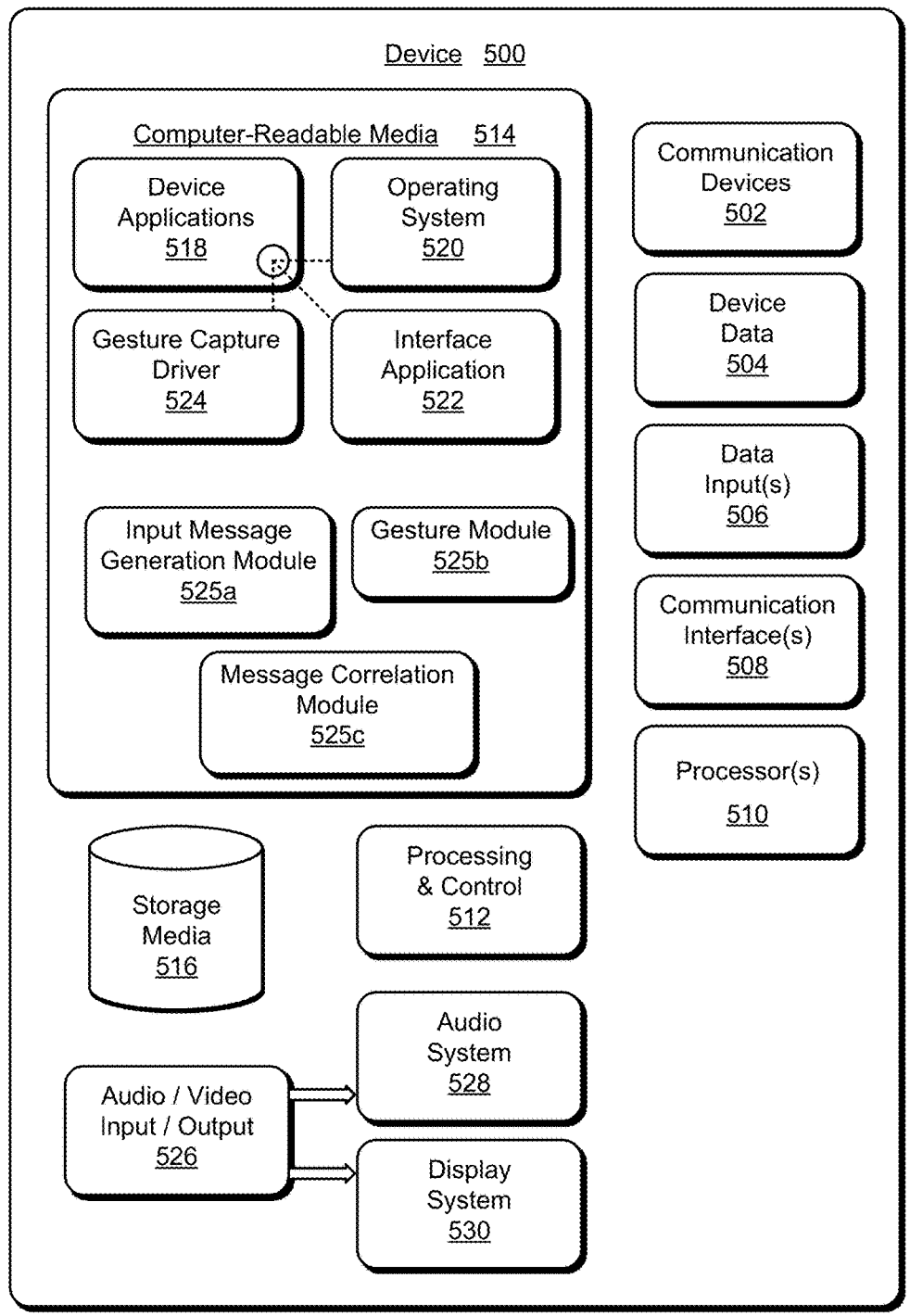
FIG. 5 illustrates an example computing device that can be utilized to implement various embodiments described herein.

FIG. 5 illustrates various components of an example device 1000 that can be implemented as any type of portable and/or computer device as described with reference to FIGS. 1 and 2 to implement embodiments of the animation library described herein. Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, messages, music, television media content, recorded video content, and any other type of audio, video, and/or image data received from any content and/or data source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable or readable instructions to control the operation of device 500 and to implement the embodiments described above. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 55. The device applications 518 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 518 also include any system components or modules to implement embodiments of the techniques described herein. In this example, the device applications 518 include an interface application 522 and a gesture-capture driver 524 that are shown as software modules and/or computer applications. The gesture-capture driver 524 is representative of software that is used to provide an interface with a device configured to capture a gesture, such as a touchscreen, track pad, camera, and so on. Alternatively or in addition, the interface application 522 and the gesture-capture driver 524 can be implemented as hardware, software, firmware, or any combination thereof. In addition, computer readable media 514 can include an input message generation module 525*a*, a gesture module 525*b*, and a message correlation module 525*c* that function as described above.

Device 500 also includes an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Conclusion

In at least some embodiments, input provided by a single source generates events representing multiple source types through a mapping process, e.g. a touch input generates both touch and mouse events. By configuring the system to not recognize certain gestures, messages associated with the events of the different source types are then interleaved and provided to an associated application for processing. Efficiencies are gained by configuring the system to interleave the messages associated with the source types because messages of one source type can be processed sooner than if the messages of the one source type were queued up and sent in a non-interleaved fashion.

In at least some other embodiments, messages associated with the different source types are correlated in a cache. Data that is produced from one message is saved and re-used in association with a correlated message so that the processing that produced the data does not have to be repeated.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

The invention claimed is:

1. One or more computer readable memory devices embodying computer readable instructions which, when executed, implement a method comprising:
   receiving a first message associated with a first input type;
   processing the first message to produce data and caching the data;
   receiving a second message associated with a second different input type;
   correlating the second message with the first message; and
   re-using the cached data produced by processing the first message to process the correlated second message so that the processing that produced the data does not have to be repeated for the correlated second message, wherein the first input type comprises one of a touch input type or a non-touch input type and the second different input type comprises a different one of the touch input type or the non-touch input type.

2. The one or more computer readable memory devices of claim 1, wherein the first input type comprises the touch input type.

3. The one or more computer readable memory devices of claim 1, wherein the first input type comprises the non-touch input type.

4. The one or more computer readable memory devices of claim 1, wherein processing the first message to produce data comprises producing data associated with a hit test.

5. The one or more computer readable memory devices of claim 1, wherein processing the first message to produce data comprises producing data associated with a hit test and additional data in.

6. The one or more computer readable memory devices of claim 1, wherein the second different input type comprises a mouse input type.

7. A computer-implemented method comprising:
   receiving a first message associated with a first input type;
   processing the first message to produce data and caching the data;
   receiving a second message associated with a second different input type;
   correlating the second message with the first message; and
   re-using the cached data produced by processing the first message to process the correlated second message so that the processing that produced the data does not have to be repeated for the correlated second message, wherein the first input type comprises one of a touch input type or a non-touch input type and the second different input type comprises a different one of the touch input type or the non-touch input type.

8. The computer-implemented method of claim 7, wherein the first input type comprises the touch input type.

9. The computer-implemented method of claim 7, wherein the first input type comprises the non-touch input type.

10. The computer-implemented method of claim 7, wherein processing the first message to produce data comprises producing data associated with a hit test.

11. The computer-implemented method of claim 7, wherein processing the first message to produce data comprises producing data associated with a hit test and additional data.

12. The computer-implemented method of claim 7, wherein the second different input type comprises a mouse input type.

13. A computing device comprising:
   one or more processors; and
   one or more memories comprising instructions stored thereon that, responsive to execution by the one or more processors, perform operations comprising:
   receiving a first message associated with a first input type;
   processing the first message to produce data and caching the data;
   receiving a second message associated with a second different input type;
   correlating the second message with the first message; and
   re-using the cached data produced by processing the first message to process the correlated second message so that the processing that produced the data does not have to be repeated for the correlated second message, wherein the first input type comprises one of a touch input type or a non-touch input type and the second different input type comprises a different one of the touch input type or the non-touch input type.

14. The computing device of claim 13, wherein the first input type comprises the touch input type.

15. The computing device of claim 13, wherein the first input type comprises the non-touch input type.

16. The computing device of claim 13, wherein processing the first message to produce data comprises producing data associated with a hit test.

17. The computing device of claim 13, wherein processing the first message to produce data comprises producing data associated with a hit test and additional data.

18. The computing device of claim 13, wherein the second different input type comprises a mouse input type.

19. The computing device of claim 13, wherein the second different input type comprises an input type other than a mouse input type.

* * * * *